Figures 1, 2:
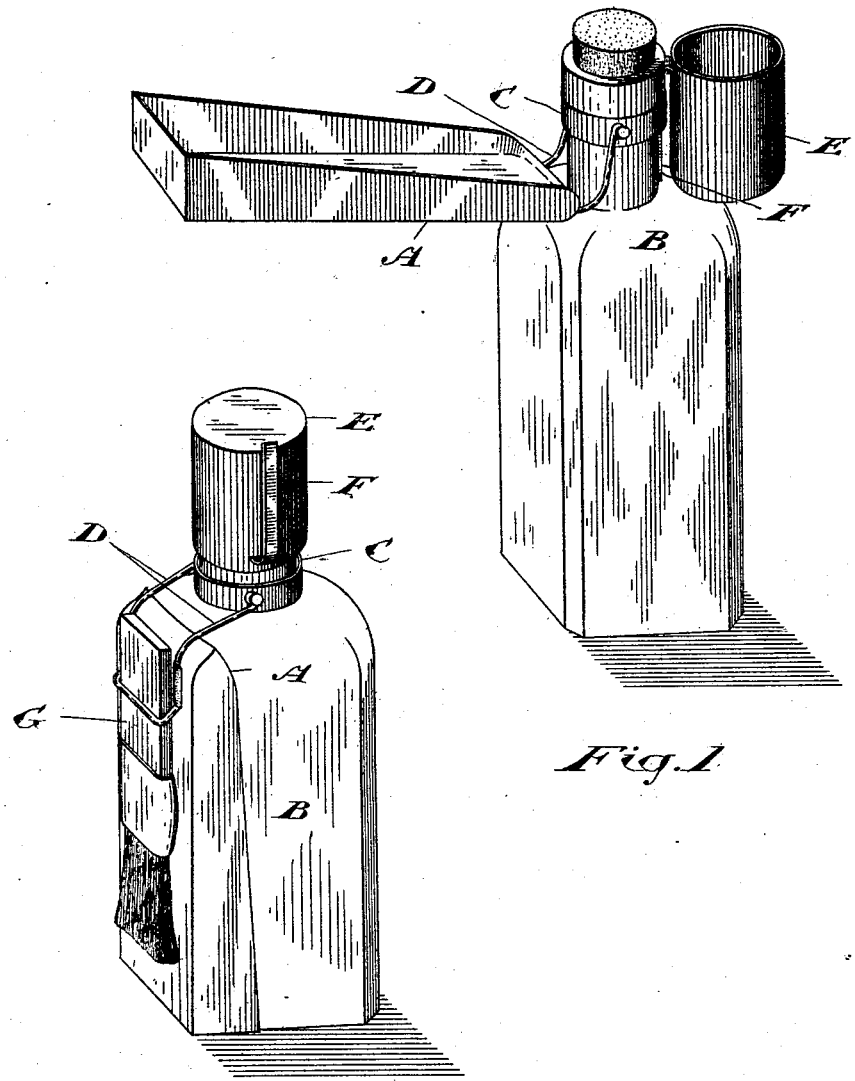

(No Model.)

T. G. WATSON.
ATTACHMENT FOR VARNISH OR SIMILAR BOTTLES.

No. 487,502. Patented Dec. 6, 1892.

Witnesses
H. C. Woodward
W. G. McMillan

Inventor
T. G. Watson
by Donald C. Ridout & Co,
Atty's

UNITED STATES PATENT OFFICE.

THOMAS GRAHAM WATSON, OF PARIS, CANADA.

ATTACHMENT FOR VARNISH OR SIMILAR BOTTLES.

SPECIFICATION forming part of Letters Patent No. 487,502, dated December 6, 1892.

Application filed January 28, 1892. Serial No. 419,583. (No model.) Patented in Canada March 4, 1892, No. 38,405.

*To all whom it may concern:*

Be it known that I, THOMAS GRAHAM WATSON, of the town of Paris, in the county of Brant, in the Province of Ontario, Canada, have invented a certain new and useful Attachment for Varnish or Similar Bottles, (patented in Canada March 4, 1892, No. 38,405,) of which the following is a specification.

The object of the invention is to provide an attachment to a varnish-bottle which may be readily adjusted to receive and hold the varnish or similar liquid when required for use; and it consists, essentially, of a small pan made such a shape as to fit over the side of the bottle and so connected to said bottle that it may readily be adjusted in a horizontal position for holding the liquid, a detachable pot being also provided and means for holding the brush, substantially as hereinafter more particularly explained.

Figure 1 is a perspective view showing the pan and pot in position ready for use. Fig. 2 shows the pan and pot closed over the bottle.

All housekeepers who use varnish or prepared paint for touching up articles of furniture are aware that in order to use the varnish or the liquid it is necessary to pour it out of the bottle into a saucer or similar vessel. They are also aware that it frequently occurs that a careless servant will often take an expensive saucer for holding the liquid and that the said saucer frequently is broken or so badly soiled that it is practically useless for ordinary purposes.

By the adoption of my invention a receptacle will always be at hand ready for use, and when not required may readily be adjusted to fit the bottle and take up no more room.

In the drawings, A represents a pan made to fit over the side of the bottle B, as indicated in Fig. 2. This pan is hinged to a band C, which is made a loose fit upon the neck of the bottle B.

The fingers D, which connect the pan A to the band C, are shaped as more clearly shown in Fig. 1, so that when the pan A is adjusted to fit against the bottle, as indicated in Fig. 2, the fingers D fit around the top of the body of the bottle, and when the pan is thrown over onto the other side of the bottle the fingers D hold the said pan in the horizontal position indicated in Fig. 1, the band C in this latter case being held against the flange formed around the mouth of the bottle, while the said pan rests upon the top of the body of the bottle when the pan is adjusted in the position shown in Fig. 2.

Owing to the manner of connecting the pan A to the bottle, the contents of the bottle may be easily poured into the pan, only a sufficient quantity being poured out to cover the surface it is desired to paint or varnish.

The cap E is designed to fit the top of the bottle when not in use, as indicated in Fig. 2, and is provided with a hook F, so that when required for use the said hook can be slipped onto the band C, as indicated in Fig. 1, in which condition the cap can be used to receive turpentine in order that the brush G may be easily kept soft and clean.

What I claim as my invention is—

1. The pan A, hinged to the bottle B and adapted to partially cover said bottle B, substantially as and for the purpose specified.

2. The pan A, provided with fingers D, pivoted to the band C, surrounding and movably connected to the neck of the bottle B, substantially as and for the purpose specified.

3. The pan A, provided with fingers D, pivoted to the band C, movably connected to the neck of the bottle B, in combination with the cap E, provided with hook F to fit between the band C and neck of the bottle B, substantially as and for the purpose specified.

Paris, January 16, 1892.

THOMAS GRAHAM WATSON.

In presence of—
CHS. WHITELAW,
JNO. LINDSAY.